W. E. SAWYER & A. MAN, 4 Sheets—Sheet 1.

Assignors to THE ELECTRO DYNAMIC LIGHT COMPANY.

ELECTRIC LIGHTING SYSTEM.

No. 10,134. Reissued June 6, 1882.

WITNESSES:

J. Ryan Bull

Saml R. Taylor

INVENTORS

W. E. Sawyer

Albon Man

BY Amos Broadway

ATTORNEY.

W. E. SAWYER & A. MAN, 4 Sheets—Sheet 2.

Assignors to THE ELECTRO DYNAMIC LIGHT COMPANY.

ELECTRIC LIGHTING SYSTEM.

No. 10,134. Reissued June 6, 1882.

WITNESSES:

J. Egan Bull

Saml R. Taylor

INVENTOR:

W. E. Sawyer

Allan Man

BY Amos Broadley

ATTORNEY.

W. E. SAWYER & A. MAN,

Assignors to THE ELECTRO DYNAMIC LIGHT COMPANY.

ELECTRIC LIGHTING SYSTEM.

No. 10,134. Reissued June 6, 1882.

Witnesses:
J. Earl Bull
Saml R. Taylor

Inventor:
W. E. Sawyer
Albon Man By
Amos Broadnax
Attorney.

4 Sheets—Sheet 4.

W. E. SAWYER & A. MAN,

Assignors to THE ELECTRO DYNAMIC LIGHT COMPANY.

ELECTRIC LIGHTING SYSTEM.

No. 10,134. Reissued June 6, 1882.

Witnesses:
J. Ryan Bull
Saml R. Taylor

Inventors:
W. E. Sawyer
Albon Man
By Amos Broadnax
Attorney

UNITED STATES PATENT OFFICE.

WILLIAM E. SAWYER, OF NEW YORK, AND ALBON MAN, OF BROOKLYN ASSIGNORS TO THE ELECTRO DYNAMIC LIGHT COMPANY, OF NEW YORK, N. Y.

ELECTRIC LIGHTING SYSTEM.

SPECIFICATION forming part of Reissued Letters Patent No. 10,134, dated June 6, 1882.

Original No. 205,303, dated June 25, 1878. Application for reissue filed May 14, 1881.

*To all whom it may concern:*

Be it known that we, WILLIAM EDWARD SAWYER, of the city, county, and State of New York, and ALBON MAN, of Brooklyn, in the county of Kings and State aforesaid, have jointly invented certain new and useful Improvements in the Application of Electricity to Electric Lighting, of which the following is a description in such full, clear, concise, and exact terms as to enable any one skilled in the arts to which our invention appertains or with which it is most nearly connected to construct and practice the same, reference being had to the accompanying drawings, making part of this specification, and to the figures and letters of reference marked thereon.

Figure 1:
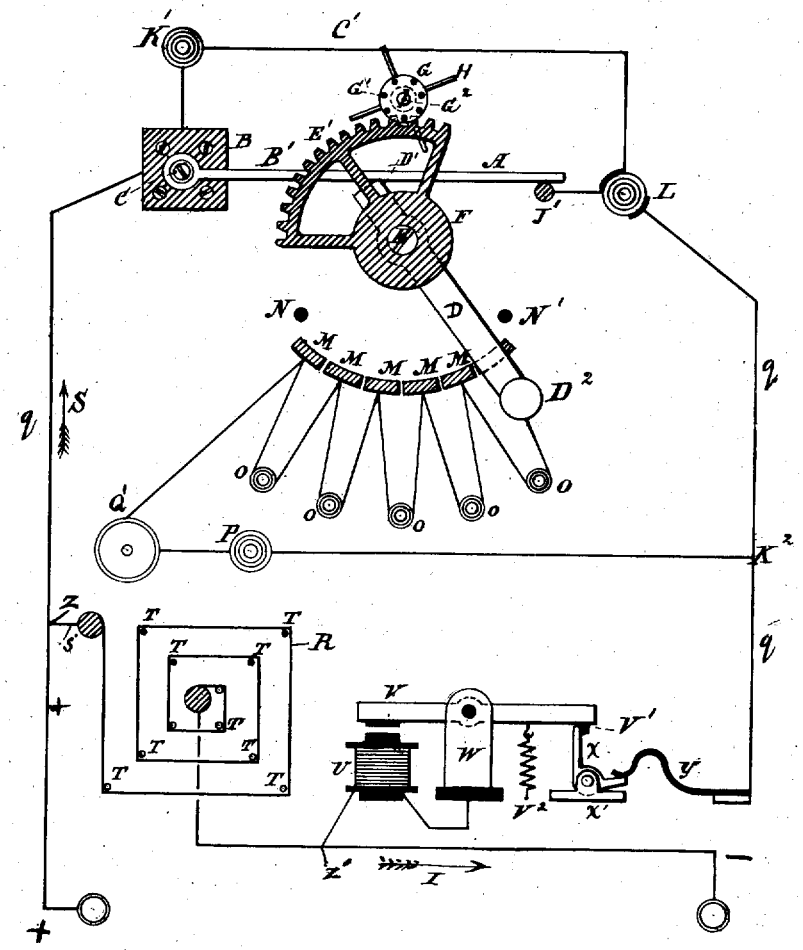
Figure 2:
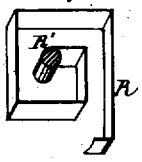
Figure 3:
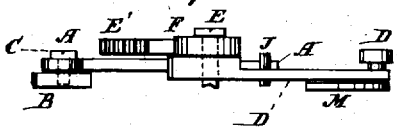
Figure 4:
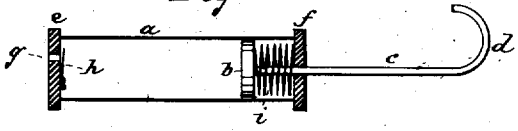
Figure 5:
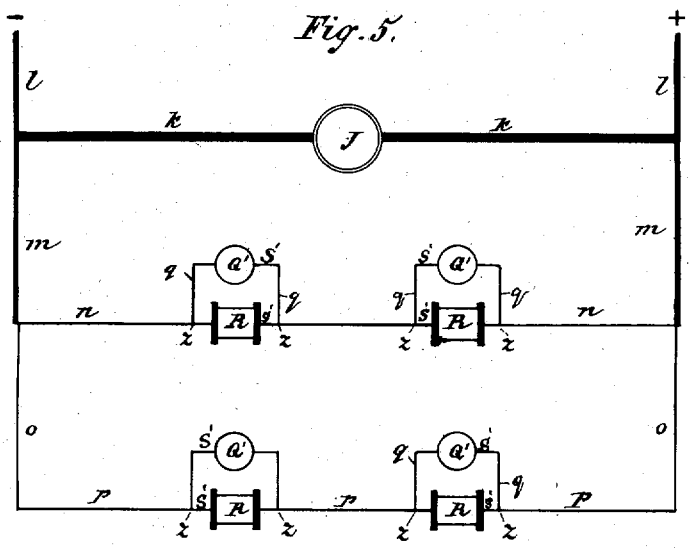
Figure 6:
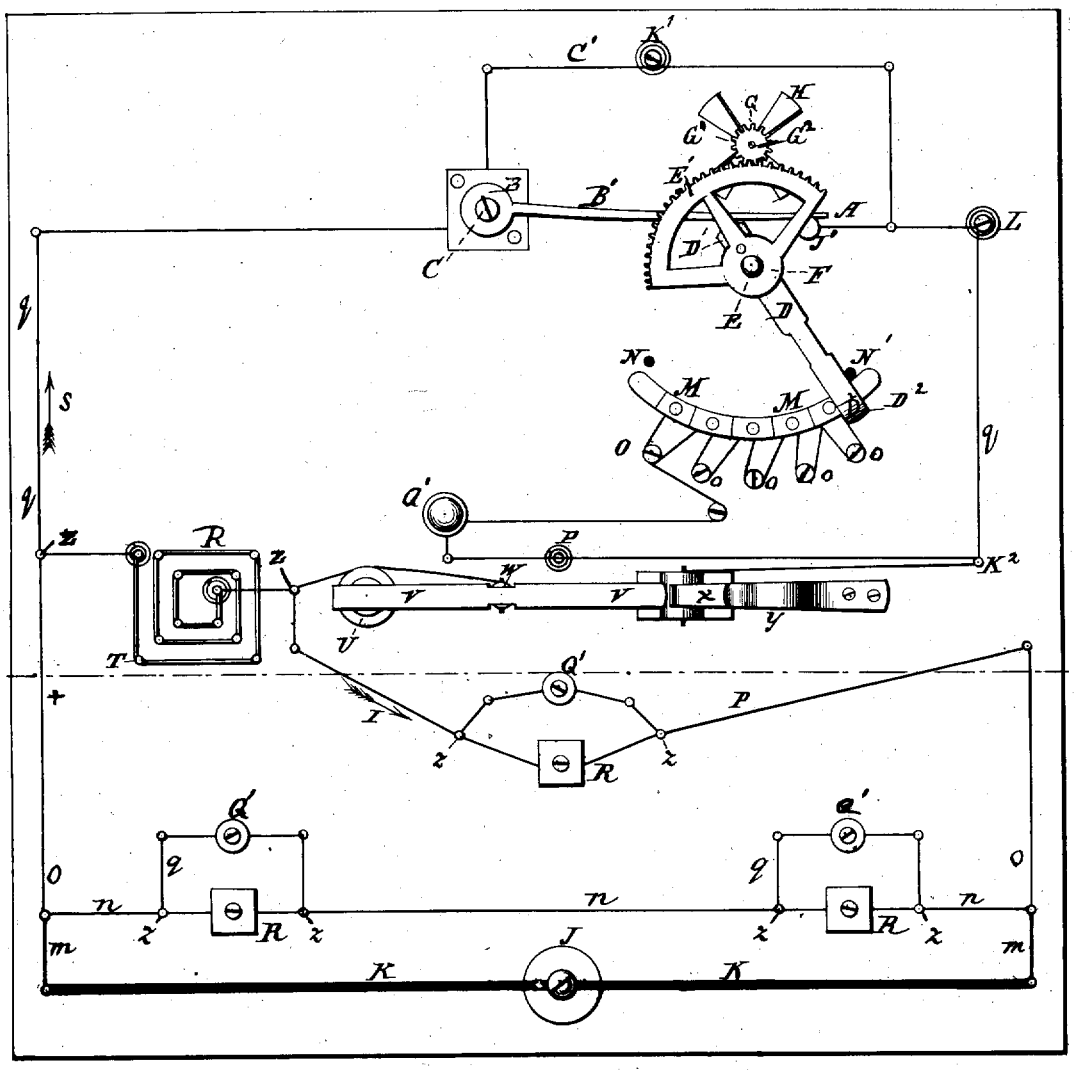
Figure 7:
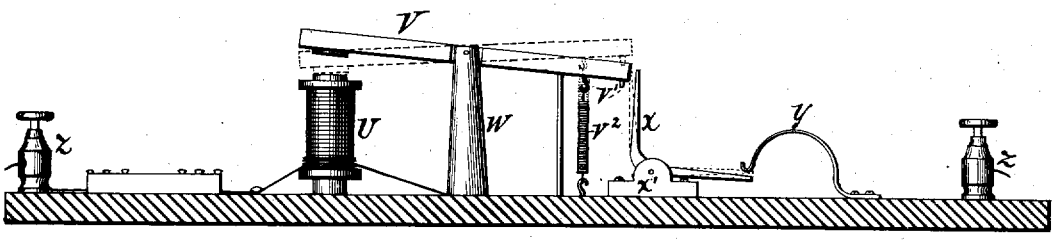

By Figure 1 of the drawings is shown a general plan of the invention in its application to each lamp, including a top view of a lamp-lighter and a side view of a safety-switch. Figs. 2 and 3 are detail parts of Fig. 1. Fig. 4 is an outline of a device that may be made part of the lamp-lighter. Fig. 5 is a diagram of circuits combining several sets of apparatus shown by Fig. 1. Fig. 6 is another view of the arrangements illustrated by Fig. 1, showing its connection to a number of lamps in circuit. Fig. 7 is a side view of the cut-off or safety-switch, a top view of which is included in Fig. 6.

The operation of our invention, its object, and use are described as follows:

Referring first, for convenience of description, to Fig. 5 of the drawings, J is a generator of electricity, supplying the outletting conduits or conductors *k k*, which branch into conductors *l l* and *m m*, the continuations of which are shown only in the case of the conductors *m m*, the circuits of conductors *l l* being merely indicated in Fig. 5 by the + and — signs. There may be any number of branches *l l* and *m m* leading from the outletting-conductors, according to the volume of current supplied by the generator J. The outletting-conductors *k k*, as indicated by the thickness of the lines, are large, in order to conduct, without heating and consequent waste, the greatest quantity of current supplied.

It is clear that all of the conductors may be of uniform size; but the expense of such against conductors diminishing in transverse mass as they extend onward is so considerable that we have adopted the latter plan. Therefore we make the first section, *m m*, of the circuits smaller than the outletting-conduits, and the next sections, *o o*, Fig. 5, still smaller, and so on indefinitely. This arrangement of the conductors is the first step in the construction of the system of conductors making part of our invention; but, though desirable, it is not a necessary part of the system.

The next step is to divide and subdivide the conductors in which the lamps are placed at the point or points where the current is to be made available for lighting. This is done by making a closed offset or division in the conductor, the lamp and its machinery being placed in one side of the offset or division and a resistance in the other.

In the drawings we have shown the lamp, the lamp-lighter, and the safety-switch or cut-off of our invention placed in the offset or division *q*, the resistance R being placed in the opposite division of the branch conductors *n* and *p* between the points of division and reunion in the conductors. By these means we obtain two paths for the current in the conductor, one around and the other through the lamp and its machinery, all indicated by Q′, Fig. 5.

The next step is the arrangement of the lamp and its machinery in the divided circuit or offset *q*. This is done as follows, reference being had to Figs. 1 and 6, in which Q′ is the lamp; A D M, the lamp-lighter; U V *x y*, the safety-switch or cut-off, and R the resistance indicated in the diagram.

The letters *z z*, Figs. 5 and 6, indicate the points at which the lighting-circuits leave the branches *n* and *p* to enter the lamp and its machinery. The machinery of the lamp consists of the conductors to and about it, the lamp-lighter, by which the current is governed, and the safety-switch or cut-off, by which, in certain contingencies, the lamp is automatically cut out of circuit.

The lamp-lighter consists of a flat metallic spring-lever, A, fixed to a holder, B, by means of a screw, C. This lever makes connection with the contact-point J′ when the lamp Q′ is not in circuit, and also of a lever, D, working around a pivot or stud, E, and provided with a finger-piece, D². This lever D has a cam-projection, D′, on its upper end for the purpose of lifting the spring A from contact with the point J′. The said lever has also fixed upon its short end a cogged sector, E′, the teeth of which mesh into the cog-pins G′ of pinion G, supported upon a stud, G². The object of this cogged sector and pinion is to steady the motion of the lever D by the inertia of the counter-balance or some resisting force to guard against the danger of turning the current into the lamp too rapidly. To this end the fans or arms H are fixed in the pinion to retard its motion and increase the force necessary to move the lever D. Any other means of insuring a gradual movement of the machinery will answer the purpose, and as an example we have indicated by Fig. 4 a modification that may be made in this apparatus, *a* being a tube of glass or metal, in which travels a plunger, *b*, on piston-rod *c*, provided with finger-hook *d*. The piston-rod works loosely in the tube-head *f*, and the plunger is pressed toward tube-head *e* by coil-spring *i*. In the head *e* is an opening, *g*, provided with a valve, *h*. This device may be attached to the apparatus of Fig. 1, so that, for instance, when the plunger is drawn into the position shown a catch shall take hold of the lever D, and the piston-rod being released and the valve *h* closing, the slow escape of the air as the plunger is followed by spring *i* will cause the piston-rod to slowly move the lever D and light the lamp. This piston-rod disengaging when the lamp is lighted, all that is necessary in order to put out the light is to move the lever D back to the position it occupies in Fig. 1, and this may be accomplished by a second catch upon the piston-rod *c* and the same movement of the rod as that which takes place upon lighting the lamp; but since, as before observed, any retarding device will answer the same purpose, we have not deemed it necessary to enter into details of modifications, which would only needlessly incumber our specification; and said lamp-lighter consists also of the contact points or pieces M M M M and resistances K′, L, and O, all of which are more or less affected by the motion of the lever D.

K′ and L are resistances of, say, fifteen ohms each. P is a resistance of, say, ten ohms, and O O are five resistances of, say, two ohms each. N and N′ are stops for lever D, and M M are six metallic contact-pieces, with which the lever D makes connection as it is moved, which contact-pieces are connected, as shown, with five resistances, O O. All of these resistances may be of the character of resistance R, which, as is better shown in Fig. 2, is a flat wire or ribbon of metal. This ribbon is wound over pins T, fixed to any suitable insulating-base. The conductor of which the resistance R is made may be of any desirable form. Being in the shape of a ribbon, the conductor constituting the resistance has a large radiating-surface, and a space being left between each layer to permit of free access of air, any heat which may be evolved is rapidly dissipated.

The resistance R, Figs. 5 and 6, as it is great or small, operates to divert more or less of the current from the conductors into the set-off or division of the conductor in which the lamp and its machinery are placed.

The safety-switch is of the simplest construction. It consists of an ordinary electro-magnet, U, an ordinary armature-lever, V, a standard, W, in which the armature-lever is pivoted, and a retractile spring, V², by which the armature is held off of the magnet.

The pin V′, fixed to the lever V, serves to hold the bent lever *x*, working in the bearing *x′*, in the position shown in the drawings, Fig. 1. When, however, the lever V is attracted by magnet U, the pin V′ is lifted, and the lever *x*, actuated by spring *y*, escapes from its imprisonment, as in Fig. 7.

In place of the safety-switch, we may interpose in the circuit a section of a conductor more readily fused than the conductors constituting the rest of the circuit, so that when there is too much current this section will be instantly melted and the continuity of the current destroyed.

The operation of our apparatus is as follows, reference being had to Figs. 1 and 6 of the drawings:

The current enters from the point *x* and divides at the point *z*, the required portion entering the lighting-circuit *q* of any one lamp, the remaining portion going through the resistance to the other lamps in circuit.

To illustrate better the operation in detail, we will follow first that portion of the current represented by the arrows S and I, Figs. 1 and 6. Assuming the lever D to be in the position shown by the drawings, the current passes from the point *z*, through the spring-lever A, contact-point J′, resistance L, of fifteen ohms, and thence through spring *y*, levers *x* and V, standard W, and magnet U, to point *z′*. In this position of the lever D the lamp is not in operation, and the resistance of the circuit is fifteen ohms, disregarding everything excepting the resistance L.

To light the lamp the lever D is moved to the left, and while it is still in connection with the first contact-point, M, its end D′ makes connection with spring-lever A, breaking connection between A and J′, and at the same time, without breaking the current, divides it into two sub-circuits, one of which is from *z* to resistance K′, of fifteen ohms, resistance L, of fifteen ohms, and the safety-switch to point *z′*; total resistance of this sub-circuit, thirty ohms. The other sub-circuit is from point *z*, by way of spring A, lever D, contact-point M, the five resistances O O O O O, of two ohms each, the lamp of ten ohms, and the resistance P, of ten ohms, to the point *z′*; total resistance of the lamp-circuit, thirty ohms. The lighting-circuit being now divided in two sub-circuits of thirty ohms resistance each, the resistance of the circuit is still fifteen ohms; but the lamp is not yet illuminated. Now, to bring the lamp up to its proper luminosity, the necessary portion of the current of the lamp-circuit must be turned into the illuminating-conductor of the lamp. This is done by turning the lever D to the left, cutting out the resistances O O O O O until the desired degree of luminosity is reached.

It will thus be seen that the lamp-lighter of our invention not only prevents the too sudden heating of the carbon, but practically obviates the disturbing influence of great changes in resistance which have heretofore accompanied the lighting or extinguishing of a lamp; and it will also appear that, inasmuch as the sub-circuits unite at $K^1$, the united current passes through the safety-switch to the point $z'$ by way of the spring $y$, lever V, standard W, and magnet U, so that in case of an excess of current in the lamp-circuit the magnet U will be unduly energized and attract the armature, by which the lever $x$ will be released and the circuit broken, thus cutting the lamp out of circuit; and it will be observed, also, that there is a constantly-closed shunt-circuit, $c'$, around the lamp, so that in case the lamp-circuit be broken, or in case of an abnormally-great electrical resistance in the lamp, its machinery, or circuit, the current will be increased in the shunt $c'$ around the lamp, leaving that particular lamp out of circuit, or to go out, without materially affecting any of the other lamps in circuit, the current being automatically transferred from the circuit B′ to the shunt $c'$ without interruption, the resistance in the shunt $c'$ being at least equal to the resistance in the lamp-circuit B′.

It will of course be understood that to prevent the lamp from being cut out of circuit by the safety-switch U V W $x$ $y$, unless the current becomes abnormally great, the retractile strength of the spring $V^1$ must be made equal to the attracting force of the magnet when the lamp has all the current it will bear with safety. It will also be understood that the shunt-circuit $c'$ and the circuit B′ are both closed, whether the lamp is illuminated or not, so that in case there is the least obstruction in the circuit of the lamp the current will be correspondingly increased in the shunt, leaving the circuit constant in all the other lamps. Again, if there is an excess of current it will be divided, a portion going through all the shunts and a portion through all the lamps in circuit.

In the lamp of our invention described in Letters Patent of the United States No. 205,144 a small piece of carbon is heated to incandescence in an atmosphere with which it will not chemically combine.

Other attempts to produce such a lamp have been made; but, among other things, it has been found almost impossible to prevent fracture of the carbon. The fracturing of the carbon is mainly due to sudden changes of temperature. While it becomes soft and pliable under the great heat of the current, at ordinary temperature it is extremely brittle, and instantaneously heating it from its normal condition to a very high temperature tends to disrupt the particles and establish the voltaic arc, by which in a moment the carbon is destroyed. Our lamp-lighter also avoids this difficulty.

To avoid undue electrical heating from accidental or other cause in the conductors, and the great resistance occasioned by the heating of a conductor, especially in the form of rheostats, we construct our artificial circuits, rheostats, or resistances R of flat or ribbon wire, in order that they may present considerable radiating-surface, and thereby keep cool when otherwise they might be melted by excessive heat.

The application of the lamp-lighter and cut-off or safety-switch to electric lamps in which the light is produced by the voltaic arc by removing resistances from the circuit or cutting lamps out of circuit in proportion as the carbons separate or the resistance becomes too great will be comprehended without further explanation.

Recurring now to Fig. 5, in which we have shown more than one branch from a single source of electricity and more than one lamp in each branch, we are aware that it is not new to place a number of lamps in series in the circuit of a generator, or to divide the current among several conductors each containing a single lamp, or to divide the current among several cross-branches each containing a single lamp. But besides other points of novelty described in this specification, it is new with us to divide the current among several conductors or several cross-branches each containing two or more lamps, as it is also new to associate each lamp with two constantly-closed circuits having an electrical resistance at least equal to the lamp or group of lamps; and it is also new to associate an automatic safety-switch or cut-off with the shunt around each lamp or group of lamps, to cut it out of circuit automatically in case of accident to the lamp or group of lamps without sensibly affecting any other lamp or group of lamps in the system, excepting that lamp or group of lamps with which the safety-switch is associated in the shunt embracing it or them; and, lest one of the principal features of our arrangement may not be apparent, we will proceed to explain the same more in detail.

It is well understood, first, that to produce a good electric light a current of electricity combining considerable quantity with considerable intensity is indispensable; second, in dividing the electric current among a large number of lamps, if there is a conductor from the generator to each lamp or a cross-branch to each lamp, the quantity of current supplied must be very great, and in the event of a short-circuit occurring in any lamps the result would be disastrous to the lamp, if it would not extinguish all the other lamps; third, in placing a large number of lamps in series each lamp having a considerable resistance, the intensity of the current, in order to overcome the combined resistance, must be very great, and to obtain the proper intensity of current in each case is far more expensive than it is to obtain a current of great quantity with less intensity, as in the case of our invention.

To illustrate the disadvantage attending the placing of very many lamps in series, let it be assumed that there are one hundred lamps in circuit, and that the resistance of each lamp is ten ohms, then the combined resistance of all the lamps is one thousand ohms, which, in the service of current for electric lighting, is inconvenient, if not impracticable; and, moreover, if the circuit is broken in one of the lamps, the effect is to extinguish all the rest. Now, instead of placing the one hundred lamps in series, assume that there are one hundred conductors, and that in each conductor there is placed one lamp of ten ohms resistance. Then the joint resistance of the one hundred lamps will be but one-tenth of an ohm, not to mention the wear and tear upon the generator of so slight a resistance; and in case the lamp in any one of the conductors is short-circuited, so as to cut out the resistance of the lamp and its machinery, the resistance of that conductor will be *nil*, while the resistance of the other conductors having their lamps intact will remain constant. The current will then flow through the conductor of least resistance, the effect of which will be to extinguish all the other lamps in the remaining ninety-nine conductors. If to avoid this we increase the resistance of the conductors artificially or otherwise outside of the lamps, we simply waste current in overcoming the added or artificial resistance. Adopting, finally, our plans, let it be supposed that there are ten conductors or cross-branches leading from the generator, each containing ten lamps of ten ohms resistance each. The combined and joint resistance of the circuit of the generator is ten ohms, $\frac{10\times10}{10}$ 10. This resistance of the circuit is better suited to the generator, and should a lamp short-circuit the result would not be disastrous; on the contrary, it could hardly be detected. The very slight proportion of current taken from ninety lamps in the nine perfect conductors and the very slight proportion of current added to nine lamps in the conductor containing the short-circuiting lamp would have no appreciable effect upon either the ninety or the nine.

Referring again to the lamp-lighter, it is apparent, first, that there may be any number of resistances O in each lighter of any number of ohms or parts of ohms resistance each; second, that a portion of the current is turned out of circuit $c'$ by turning the lever D to the extreme right; third, that in transferring the current into the circuit of the lamp the resistance of the conductor to the lamp will decrease, while the resistance in the shunt circuit remains constant, the resistance K′ becoming operative as the circuit is turned into the lamp; fourth, that everything in the lamp-lighter, excepting the bar A, lever D, resistances O O O O O, and lamp Q′, may be omitted and still have an operative apparatus, since the resistances O may be increased to any extent, so that when they are all in circuit the current will be too weak to heat the carbons, while by turning them out the lamp can be illuminated to any degree of luminosity.

By Fig. 6 of the drawings is fully shown the relation and connection of the lamp-lighter, the automatic cut-off or safety-switch, the combination of conductors and circuits, and the several lamps in the circuits; and by the foregoing specification, taken in connection with the accompanying drawings, the arrangement and combination of the circuits, the construction and operation of the lamp-lighter and the automatic cut-off or safety-switch, of themselves and in relation to each other and to the circuit and lamps, will be readily understood, and by said description and drawings it will appear to any one skilled in the art or science of electricity that our invention embraces and includes the following new and useful features, parts, and combinations of parts, all of which and the object of which are described or suggested in the following claims—that is to say,

We claim—

1. In an electric lighting system, the combination of a generator of electricity which is the common source of supply for the system, two or more conductors, and two or more electric lamps in each of said conductors, or in circuits derived therefrom, substantially as described, for the purpose specified.

2. In an electric lighting system, the combination with the circuit of resistance consisting of wire having great radiating-surface and having the several coils or convolutions composing the same held apart to facilitate the access of the air and the escape of the heat, substantially as described.

3. In an electric lighting system composed of a number of lamps connected in circuit, an automatic electric safety-switch combined in the lighting-circuit of each lamp, and through which the current of said circuit flows to the other lamps in circuit, said safety-switch being connected to its own lamp and to the other lamps in circuit to disrupt the circuit of its particular lamp in case of an excess of current therein, leaving the circuit of the remaining lamps intact.

4. With each lamp-circuit B′ of an electric lighting system, the combination of a shunt, $c'$, and an electric safety-switch, the shunt and lamp-circuit each providing a closed path for the current at the same time, one through and one around the lamp, and the safety-switch operating to cut the lamp out of circuit in case of an excess of current either in the lamp or in its shunt-circuit.

5. With the lamp-circuit, the combination of a closed shunt-circuit containing a resistance at least equal to the resistance of the lamp, and an automatic electric safety-switch with each lamp, the shunt to furnish a path for the current in case of an abnormal resistance in the lamp, the resistance to keep the current in the lamp when the flow is normal, and the safety-switch to cut the lamp out of circuit in case of an excess of current therein.

6. In combination with a constantly-closed lamp-circuit, B′, having resistances O combined therewith, a constantly-closed shunt-circuit, *c*′, having resistances K L, and a lighting-switch, A D, the switch coacting with the two closed circuits and the resistances thereof to gradually transfer the current from one closed circuit to the other for the purpose of gradually illuminating or extinguishing the lamp, substantially as described.

7. In an electric lighting system, a lighting-circuit conductor, *n*, divided at *z z*, between which points of divisions the lamps are placed, one branch of said divisions provided with a resistance, R, to divert the necessary current into the other divisions forming the lighting-circuit, said lighting-circuit consisting of a lamp-circuit, B′, and a shunt-circuit, *c*′, containing a resistance at least equal to the resistance of the lamp-circuit, and combined with a lighting-switch, substantially as described.

8. In an electric lighting system, an electric lamp and a lamp-lighting switch combined in a divided conductor, forming two closed circuits, *q* and *n* or *q* and *p*, for the current at the same time, one through and one around the lamp, the lamp-circuit B′ being also provided with a shunt-circuit, *c*′, and combined with an electric safety switch energized by a part of the current in the system, and that cuts the lamp out when from any cause there is an excess of current in the lamp or shunt circuit, or in both.

9. In an electric lighting system, the combination, with a main-circuit conductor, *n* or *p*, of a shunt-circuit, *q*, divided in two sub-circuits, B′ and *c*′, both of which are provided with resistances, and are constantly closed for the passage of current, and with one of which the lamp is also combined.

10. In an electric lighting system, the means substantially herein described of cutting the lamp out of circuit when from any cause there is diverted from the lighting-circuit *n* or *p* an abnormally-great current in the shunt-circuit *q*, which means consist of an electric safety-switch combined with each shunt *q* and each lamp Q′, and which is called into action to cut the lamp out of circuit by any excess of current in the shunt-circuit sufficient to increase the attracting powers of the magnet of the switch until it overcomes a given counteracting force on the armature.

11. In an electric lighting system, a lighting-circuit, *n* or *p*, in which are combined a resistance, R, and a divided shunt-circuit, B′ and *c*′, having equal resistances, and an electric lamp, Q, so that the resistance R will divert a portion of the current into each division of the shunt-circuit.

12. In an electric lighting system, a lighting-circuit in which are combined a divided shunt-circuit around the lamp, a by-circuit including the lamp, and a lighting-switch, substantially as described.

13. In an electric lighting system, a lighting-circuit in which are combined a divided shunt-circuit, an electric lamp, and a safety-switch, substantially as described.

WM. E. SAWYER.
ALBON MAN.

Witnesses:
AMOS BROADNAX,
WM. H. BROADNAX.